Jan. 3, 1928.
L. J. BOISELLE
1,655,354
DISHWASHING MACHINE
Filed Jan. 10, 1925
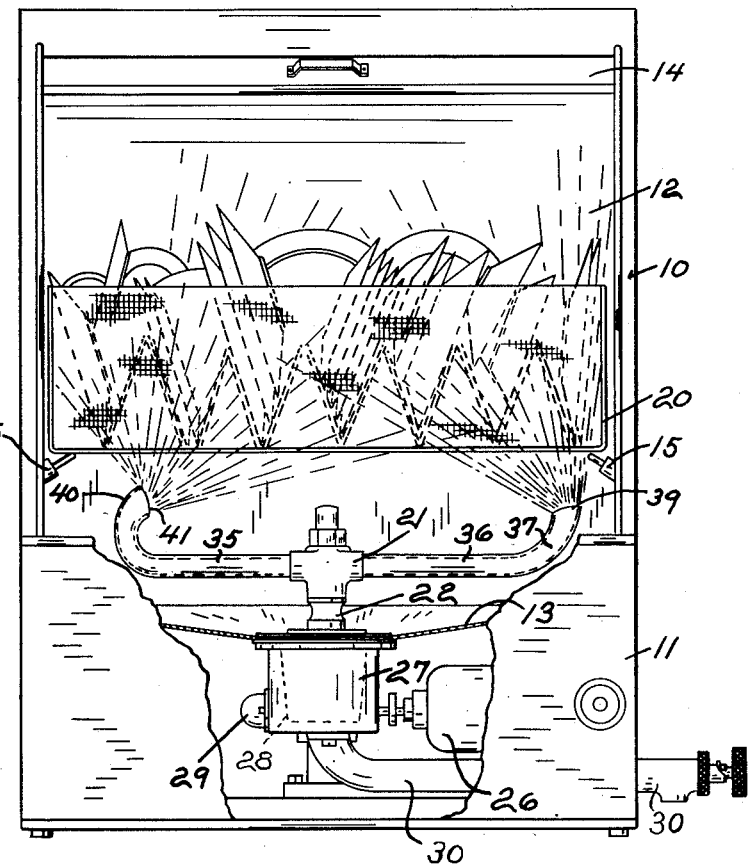
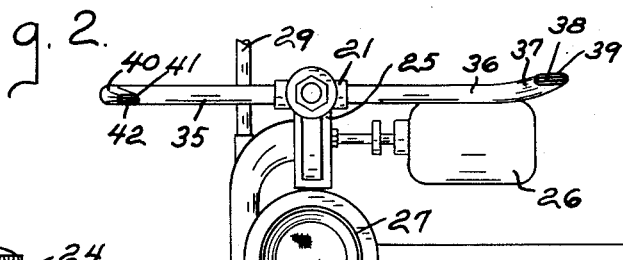
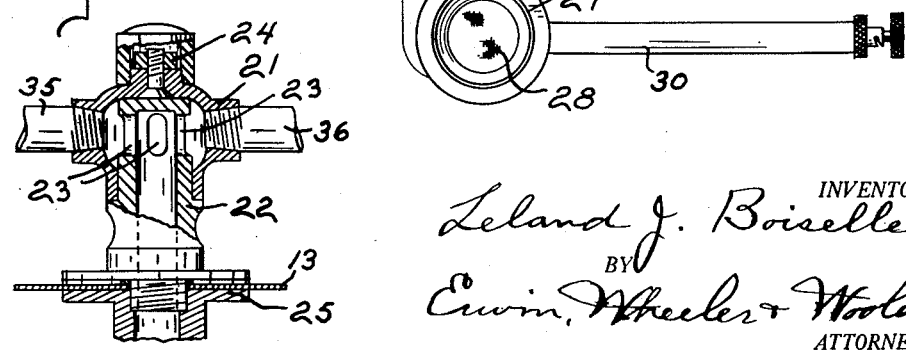
INVENTOR.
Leland J. Boiselle
BY
Erwin, Wheeler & Woolard
ATTORNEYS.

Patented Jan. 3, 1928.

1,655,354

UNITED STATES PATENT OFFICE.

LELAND J. BOISELLE, OF MILWAUKEE, WISCONSIN, ASSIGNOR TO HYDRO ELECTRIC MFG. CO., OF MILWAUKEE, WISCONSIN, A CORPORATION OF WISCONSIN.

DISHWASHING MACHINE.

Application filed January 10, 1925. Serial No. 1,643.

This invention relates to improvements in dish washing machines, and more particularly to an improved type of water distributing device or sprayer for use in connection with a tray of dishes supported in a particular relation thereto.

Broadly speaking, it is immaterial to this invention whether the distributing arms are driven mechanically or by the reaction of water expelled under pressure from the nozzles carried thereby. The invention will be particularly described with reference to a device driven by the reaction of the water, since such a device constitutes the most difficult embodiment of this invention.

The ordinary dish washing machine includes a housing, a dish supporting rack within the housing, and a water distributing device of some sort adapted to deliver the water forcibly onto the dishes which are to be cleansed. It is known that the distributing device may be power driven or may be driven by reaction. In ordinary machines, however, the pressure used to drive the reaction sprayer or distributer is merely such pressure as exists in the city water mains. Pressures at which various municipalities supply water vary between wide limits, and ordinarily average between twenty-four and thirty pounds to the square inch. At such pressures it is necessary to discharge the water from the distributing device at a considerable rearward angle with reference to the direction of travel of the delivery nozzle in order to derive sufficient power for the rotation of the sprayer.

At the angles of delivery which are commonly used in dish washing machines so large a percentage of the force of the water is expended in driving the rotary sprayer that the remaining jet is comparatively weak and is frequently thrown centrifugally by the sprayer or distributing device into contact with the inner wall of the housing instead of into direct contact with the dishes. Where this condition obtains the interior of the housing will be filled with flying spray and give the appearance of constituting a very effective machine, but it will be obvious that no considerable proportion of the water will directly strike the dishes, and the force of the spray which does fall upon the dishes after spattering against the walls of the housing will be so far spent as to be very inefficient in cleansing dishes.

It is my experience that in order to wash dishes effectively in a dish washing machine reliance must be placed on the sluicing of the dishes with the water. In other words, the water must strike the dishes with sufficient energy to sluice food forcibly therefrom. I have found further that the direction in which the water impinges upon the dishes should closely approximate a position of parallelism with the face of the dish which is struck by the water. Such food as yolk of egg is ordinarily very difficult to remove from dishes by mechanical means. I have found, however, that it will take a relatively high pressure jet of water to remove yolk of egg if the jet strikes the dish substantially at right angles, whereas a jet of relatively lower pressure will suffice if it is directed toward the dish with what I term a "sluicing" action so that it encounters the dish while moving in high speed at a relatively small acute angle with reference to that face of the dish toward which it is directed. With reference to the pressure at which water is delivered from the jet, I wish to make it clear that I recommend the use of rather higher pressures than are employed in the ordinary dish washing machines heretofore manufactured. Particularly, if a portion of the pressure is used to drive the distributing device, it becomes necessary to ensure that the pressure will be adequate to sluice the food from the dishes and to minimize the effect of centrifugal force upon the direction taken by the jet in leaving the nozzle. Since the pressure in the city mains of most municipalities is too low for my purposes, I prefer to provide a pump operated by an electric motor or other like source of power independent of water pressure and capable of delivering water to the distributing device at the requisite pressure irrespective of whether that water is received directly from the mains or is re-circulated wholly within the dish washing machine.

From the foregoing statements of problems involved in the mechanical washing of dishes and of the discoveries I have made, it will be understood to be the primary object of this invention to provide novel and improved means for directing high pressure jets of water across the faces of dishes with a sluicing action for as large as possible a proportion of the time during which the machine is in operation. It is my purpose further to make the effectiveness of the dish washing operation as nearly as possible independent of the particular way in which dishes are placed in the supporting tray or rack.

More specifically stated, it is the object of this invention to provide a dish washing machine in which the dishes are supported in horizontal racks, and the distributing device includes arms rotatable about a vertical axis and so formed as to deliver water to the dishes with a sluicing action, taking into consideration the pressure at which the water is delivered, the rate of rotation of the distributing device, and the direction of fluid delivery from the nozzle openings of the distributor.

In the drawings:

Figure 1 is a side elevation of a dish washing machine embodying this invention, the door being open and portions of the wall of the machine being broken away to expose certain parts of its internal mechanism. In this view the preferred direction of delivery of the jets of water is indicated in elevation.

Figure 2 is a diagrammatic view in plan of the water distributing connections.

Figure 3 is an enlarged detail view in section of the mounting for the rotary spray arms or distributors.

Like parts are identified by the same reference characters throughout the several views.

While it is immaterial what particular type of cabinet is used to house the mechanism herein to be described, nevertheless the cabinet herein shown is preferred. The cabinet 10 includes a base portion 11 and a dish washing compartment 12, separated from the base portion by a sump or bottom 13. A door 14, which is illustrated in a raised or open position, affords access to compartment 12 through the front of the cabinet 10. Brackets 15 on the sides of compartment 12 are arranged to support a rack 20 which may be constructed in the ordinary manner of wide mesh wire screening so formed as to support the dishes with a minimum of resistance to the passage of water therethrough. The opening in cabinet 10 which is normally closed by door 14 is preferably of sufficient size to permit the entire rack to move bodily therethrough. It is possible, therefore, to place the dishes in the rack when the rack is outside of the machine and subsequently to lift the loaded rack into place in the machine.

Immediately beneath the rack is the distributing device which sluices the dishes with water. This device includes a fitting 21 mounted for rotation about a vertical axis. The fitting 21 may conveniently be journaled upon a pipe 22 closed at its upper end and provided at 23 with laterally opening apertures for the delivery of water to the interior of the revoluble fitting 21. A nut 24 maintains the revoluble fitting 21 in its proper position axially of pipe 22.

The pipe 22 will be supplied with water under suitable pressure, preferably in excess of thirty pounds. In the preferred embodiment of the invention pipe 22 communicates with a pump casing 25 in which there may conveniently be located a centrifugal pump driven by an electric motor 26. A return pipe 27 provided with a removable strainer 28 is adapted to supply the pump with water from the bottom of the sump 13 beneath the dish washing compartment 12. In this way the machine may be operated without reference to any external source of water supply. A supply pipe 29 communicated with the inlet side of the pump, however, and through this pipe water may be supplied to the pump directly from the city mains if desired. The entire device may be drained through pipe 30 when the dish washing operation has been completed. For use at 25, a pump which is capable of delivering water at thirty-five to forty pounds pressure per square inch will be found satisfactory. The rate of delivery will depend on the size of machine desired.

The revoluble fitting 21 supports distributing arms 35 and 36 which are tubular and are preferably of differing lengths, and are provided with differently directed delivery openings or nozzles. The arm 36, comprising the longer of the two arms, is provided with a gradual upward curve at 37 and is also inclined laterally at its extremity to a very slight degree, as shown in Figure 2. The extremity of arm 36 is flattened, as shown whereby its radial dimension is increased. A slot 38, which is preferably formed radially in the extremity of arm 36, comprises a nozzle through which a fan-shaped jet of water is delivered. Due to the lateral inclination of the extremity 37 of said arm, it will be noted that the radial disposition of slot 38 is such that the fan-shaped jet will not be parallel to the axis of arm 36 but will be disposed upon a different radius drawn from the center about which the distributing device is rotatable.

It will be noted that the upper surface 39 of the extremity of arm 36 is not horizontal but is inclined toward the central axis of the machine. In other words, the outer margin of slot 38 is slightly higher than the inner margin. As a result, the fan-shaped jet issuing from slot 38 does not rise vertically therefrom but is inclined slightly toward the center of the machine somewhat as indicated in Figure 1. It has also a very slight lateral inclination, and the horizontal component of the reaction produced by the lateral inclination of the jet is utilized for the purpose of rotating the distributing device, including arms 35 and 36 and the central fitting 21.

Arm 35 has an extremity 40 which is flattened like extremity 37 of arm 36 and is curved upwardly and inwardly past the vertical. Like the extremity 37 of arm 36, the end portion 40 of arm 35 is also laterally inclined to a very slight extent in the direction opposite to the direction of rotation of the distributing device. Its end face 41 has an elongated nozzle slot 42, the direction of which is not radial but is preferably substantially parallel to the axis of tubular arm 35. The fan-shaped jet issuing from nozzle 42 is projected in a plane substantially parallel to arm 35 but laterally inclined from the vertical to a slight degree. The direction which the jet takes in said plane is such that its median line is inclined at approximately 30 or 35 degrees from horizontal substantially as shown in Figure 1.

The form and direction of the jets issuing from the discharge nozzles of the distributing device of this machine have been illustrated and described in some detail for the reason that they are regarded as having an important bearing on the operation of the machine. It has been found that the fan-shaped jets associated together in the manner above described co-operate very effectively to sluice all portions of every dish during the rotation of the distributing device.

The reason for using water under high pressure where a reaction sprayer is employed will be apparent when it is pointed out that when the water is delivered under high pressure a very slight lateral inclination of the jets is adequate for the rotation of the sprayer, and consequently, the planes in which the jets are disposed are very nearly vertical. As a result of this fact, and of the further fact that each of the jets is directed inwardly to a greater or less extent, and of the further fact that the water comprised in each jet has high velocity in the direction in which it leaves the jet, there is almost no tangible effect produced upon the jet by centrifugal force. Consequently, each jet is directed upon the dishes instead of being thrown off against the walls of the cabinet as is so often the case in the ordinary dish washing machine. The directions taken by the several component parts of the two jets are such that regardless of how the dishes are placed into the tray of the machine every dish will be subjected to a sluicing action upon its every surface during some part of the rotation of the distributing device, and the majority of the dishes will be subjected to sluicing action throughout a large part of the rotation of the device. At the same time, the direction of the jet issuing from nozzle 38 is such that to some extent this jet reaches the walls of the cabinet, thereby washing from the walls any matter which may be spattered thereon during the dish washing operation.

Reference has already been made to the fact that the planes in which the two jets are disposed are not parallel, the plane of the jet issuing from nozzle 38 being radial and the plane of the jet issuing from nozzle 42 being offset from but parallel to a radius drawn from the center about which the distributing device is rotatable. The reason for this may be found in the necessity for avoiding a dead point in the center of the machine which would otherwise not be subject to the direct sluicing action of the jets. The two jets move past each other, the one from the left and the other from the right, both being directed in a general way toward the center of the machine. In stating that both jets are directed toward the center of the machine or toward the axis of revolution, I do not mean that simply the inner portion of each fan-shaped jet travels toward the center, but I mean that there is a material part of the jet which is so delivered. As a matter of fact, in the preferred embodiment of the invention herein disclosed, the axis of each jet, or the line about which the jet is substantially symmetrical extends from the nozzle at an inclination toward the axis of revolution. Further, it will be observed that the two jets pass one another in closely adjacent planes due to the fact that one of the jets is laterally inclined with respect to the vertical plane of the other. In order, however, to provide for the reaction propulsion of the distributing device it becomes necessary to incline the two jets in opposite directions so that in moving past each other their respective planes are divergent upwardly. This would produce an untouched spot in the center of the machine if it were not for the fact that the jet issuing from nozzle 38 is angularly adjusted so that its plane intersects the plane of the jet issuing from nozzle 42. As a result, there is no part of the machine which is not subject to the direct sluicing action of one or the other of the two jets.

In operation, the pump will be assumed to be active and to be supplied with water either by re-circulation or through the supply pipe 29. Of course, if the supply pipe has the requisite pressure there will be no necessity for actuating the pump.

The pipe 22 comprises means for supplying the distributing device with water under relatively high pressure, which, for the purposes of the present description, may be regarded as in excess of thirty pounds, and preferably in excess of thirty-five pounds to the square inch. The water so supplied will pass through the apertures 23 in pipe 22 to the interior of fitting 21 through which the water issues into pipes or arms 35 and 36 ultimately to reach the nozzles of these pipes.

The water issues from the nozzles of the distributing device in fan-shaped jets, taking the direction already minutely described. In moving past each other in opposite directions and in close proximity, these jets of water reach every surface of every dish in tray 20 with a direct sluicing action such as necessarily results in forcibly removing from each dish all foreign matter adhering thereto.

The fan-shape of the jets means that water in each jet will be traveling at a variety of angles, and this fact is of great importance in effectively and thoroughly cleansing the dishes. The peculiar form of the distributing device and the relation of that device to the dish supporting tray or rack 20 will be found therefore to satisfy the objects of this invention as above expressed and to overcome the difficulties above mentioned as having heretofore been experienced in the mechanical cleansing of dishes.

I claim:

1. In a dish washing machine of the type comprising a foraminous dish support and a sluicing fluid distributor adjacent the same, a distributing device comprising a fitting revoluble about a given axis and providing a liquid conduit extending outwardly away from the axis, said conduit having a delivery aperture so positioned as to discharge liquid in a jet which has an axis inclined toward said first mentioned axis, the jet having a portion which is substantially parallel to said first mentioned axis.

2. In a dish washing machine of the type comprising a foraminous dish support and a sluicing fluid distributor adjacent the same, a distributing device comprising a revoluble fitting operatively connected to receive liquid and provided with a plurality of hollow arms for said liquid extending outwardly from the axis about which the fitting is revoluble, a delivery nozzle on each arm and connecting with the interior thereof, said nozzles being directed inwardly toward said axis about which the fitting is revoluble, and in varying inclinations with respect thereto sufficient to provide jets, the axes of which will both be inclined toward said axis of revolution.

3. In a dish washing machine of the type comprising a foraminous dish support and a sluicing fluid distributor adjacent the same, a distributing device comprising a revoluble fitting operatively connected to receive liquid and provided with a plurality of hollow arms for said liquid extending outwardly from the axis about which the fitting is revoluble, a delivery nozzle on each arm and connecting with the interior thereof, said nozzles being directed inwardly toward said axis about which the fitting is revoluble and in varying inclinations with respect thereto sufficient to provide jets, the axes of which will both be inclined toward said axis of revolution, the said nozzles being disposed to direct their respective jets past each other in different but closely adjacent planes.

4. In a dish washing machine of the type comprising a foraminous dish support, and a sluicing fluid distributor adjacent the same, a distributing device comprising a pair of divergent hollow arms revoluble about a given axis, and each providing a liquid conduit extending outwardly from said axis, said arms carrying at points remote from the axis elongated nozzle slots so disposed as to discharge a jet having a substantial portion directed toward the axis of revolution and a portion paralleling said axis of revolution, said nozzles being disposed to direct the jets toward said axis at varying inclinations.

5. As a new article of manufacture, a distributing device comprising a pair of divergent hollow arms provided at their respective extremities with elongated nozzle slots so disposed as to discharge fan-shaped jets centrally at varying inclinations, said arms being of different lengths, and the longer of said arms being provided with a nozzle slot formed to direct its fan-shaped jet more nearly upwardly than does the nozzle slot of the shorter of said arms.

6. In a device of the character described, the combination with a revolubly mounted fitting and means for supplying water to the interior thereof, of divergent arms having interior passages in communication with said fitting to receive water therefrom, the extremity of one of said arms being upwardly curved and provided with a delivery slot, and the extremity of the other of said arms being upwardly and inwardly curved and being provided with a delivery slot, said slots being adapted to deliver fan-shaped jets at various angles of inclination.

7. In a dish washing machine of the type comprising a foraminous dish support, and a sluicing fluid distributor adjacent the same, a distributing device comprising a pair of divergent hollow arms revoluble about a given axis, and each providing a liquid conduit extending outwardly from said axis, said arms carrying at points remote from the axis elongated nozzle slots each so disposed as to discharge the jet having a substantial portion directed toward the axis of revolution, and the nozzles being arranged to project their jets past one another in closely adjacent planes.

8. In a dish washing machine of the type comprising a foraminous dish support and a sluicing fluid distributor adjacent the same, a sluicing fluid distributing device comprising a revoluble fitting having divergent arms provided respectively with an upturned extremity and an extremity upwardly and inwardly curved, said extremities each being flattened in a direction to increase its extent in a vertical plane extending substantially longitudinally of the arm, and the flattened portion being slotted in a lengthwise direction, said slots forming nozzles, the nozzles being so disposed as to deliver fluid inwardly across said fitting in differing and non-parallel planes and at differing degrees of inclination.

LELAND J. BOISELLE.